US009329650B2

(12) United States Patent
Paul et al.

(10) Patent No.: US 9,329,650 B2
(45) Date of Patent: May 3, 2016

(54) CUSTOMER-CENTRIC DEMAND SIDE MANAGEMENT FOR UTILITIES

(71) Applicant: Accenture Global Services Limited, Dublin (IE)

(72) Inventors: Sanjoy Paul, Bangalore (IN); Anitha Chandran, Bangalore (IN); Gary Titus, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 542 days.

(21) Appl. No.: 13/771,827

(22) Filed: Feb. 20, 2013

(65) Prior Publication Data
US 2013/0245849 A1 Sep. 19, 2013

(30) Foreign Application Priority Data
Mar. 14, 2012 (IN) .............................. 932/CHE/2012

(51) Int. Cl.
*G06F 1/26* (2006.01)
*H02J 3/14* (2006.01)

(52) U.S. Cl.
CPC ... *G06F 1/26* (2013.01); *H02J 3/14* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
USPC .......... 700/286, 276, 294, 298, 297; 439/578; 702/62, 60; 370/241
See application file for complete search history.

(56) References Cited

U.S. PATENT DOCUMENTS

| 4,819,780 | A | * | 4/1989 | Trummer et al. .............. 194/317 |
| 5,575,483 | A | * | 11/1996 | Dineen et al. .............. 273/317.2 |
| 5,696,695 | A | | 12/1997 | Ehlers et al. |
| 7,379,997 | B2 | | 5/2008 | Ehlers et al. |
| 7,940,673 | B2 | * | 5/2011 | Ballard et al. ................ 370/241 |

(Continued)

FOREIGN PATENT DOCUMENTS

| AU | 2011200317 A1 | 9/2011 |
| CA | 2 729 211 A1 | 7/2011 |

(Continued)

OTHER PUBLICATIONS

Australian Examination Report No. 1, dated May 30, 2013, pp. 1-4, Australian Patent Application No. 2013201515, issued by IP Australia, Woden, ACT 2606, Australia.

(Continued)

*Primary Examiner* — Kidest Bahta
(74) *Attorney, Agent, or Firm* — Brinks Gilson & Lione

(57) ABSTRACT

A method and system for reducing demand on a power grid through demand side management includes receiving assigned priorities from a customer for smart appliances and for appliances plugged into sockets of one or more smart plugs of the customer, the assigned priorities indicative of a customer-preferred sequence for disconnection of, or adjustment of power to, the appliances from the power grid. The system determines whether to disconnect or adjust power to at least one of the appliances of the customer; and selects at least one of the appliances according to the assigned priorities to reduce demand on the power grid. The system sends one or more commands, the one or more commands indicative to the one or more smart plugs to disconnect or adjust power to the selected at least one of the appliances based on selecting at least one of the appliances.

51 Claims, 7 Drawing Sheets

(56) References Cited

U.S. PATENT DOCUMENTS

| | | |
|---|---|---|
| 8,176,095 B2 | 5/2012 | Murray et al. |
| 8,239,073 B2 | 8/2012 | Fausak et al. |
| 2002/0072868 A1 | 6/2002 | Bartone et al. |
| 2004/0260430 A1 | 12/2004 | Mansingh et al. |
| 2005/0102068 A1* | 5/2005 | Pimputkar et al. ............ 700/291 |
| 2005/0207081 A1* | 9/2005 | Ying ............................ 361/105 |
| 2005/0240427 A1 | 10/2005 | Crichlow |
| 2008/0177423 A1 | 7/2008 | Brickfield et al. |
| 2008/0177678 A1 | 7/2008 | Di Martini et al. |
| 2008/0306985 A1 | 12/2008 | Murray et al. |
| 2009/0016216 A1* | 1/2009 | Ballard et al. ................ 370/230 |
| 2009/0018706 A1 | 1/2009 | Wittner |
| 2009/0045804 A1 | 2/2009 | Durling et al. |
| 2009/0062970 A1 | 3/2009 | Forbes et al. |
| 2009/0276771 A1 | 11/2009 | Nickolov et al. |
| 2009/0326725 A1 | 12/2009 | Carlson et al. |
| 2010/0274407 A1* | 10/2010 | Creed ........................... 700/295 |
| 2011/0184574 A1* | 7/2011 | Le Roux et al. .............. 700/291 |
| 2012/0150359 A1* | 6/2012 | Westergaard ................. 700/291 |

FOREIGN PATENT DOCUMENTS

| | | |
|---|---|---|
| EP | 2081273 | 7/2009 |
| EP | 2 290 328 A1 | 3/2011 |
| WO | WO 01/71881 A2 | 9/2001 |
| WO | WO 03/085798 | 10/2003 |
| WO | WO 2005/040992 | 5/2005 |
| WO | WO 2007/121322 | 10/2007 |
| WO | WO 2008/088219 A1 | 7/2008 |

OTHER PUBLICATIONS

Australian Examination Report No. 3, dated Dec. 1, 2014, pp. 1-3, Australian Patent Application No. 2013201515, issued by IP Australia, Woden, ACT 2606, Australia.

European Search Report and Written Opinion from corresponding European Application No. 10 30 5078 dated Jun. 9, 2010 (8 pages).

Examiner's First Report from corresponding Australian Patent Application No. 2011200317 dated Feb. 21, 2011 (2 pages).

First Office Action from U.S. Appl. No. 13/012,331 dated Jan. 28, 2013 (21 pages).

Shailendra, B., et al., "Architecture for smart grid based consumer end solution," $13^{th}$ International Conference on Advanced Communication Technology (ICACT), Feb. 13-16, 2011, pp. 88-92, , IEEE 2011.

Australian Examination Report No. 2, dated Jun. 18, 2014, pp. 1-3, Australian Patent Application No. 2013201515, issued by IP Australia, Woden, ACT 2606, Australia.

* cited by examiner

CUSTOMER-CENTRIC DEMAND SIDE MANAGEMENT FOR UTILITIES

CROSS-REFERENCE TO RELATED APPLICATIONS

This application claims the benefit of priority to Indian Patent Application No. 932/CHE/2012, filed on Mar. 14, 2012, which is incorporated by reference.

BACKGROUND

1. Field of the Invention

The present disclosure relates generally to a system and method for allowing customer control over demand response of a central utility, and more particularly to improved control of appliances and methods to allow the customer to prioritize which appliances are to have power adjusted, up to and including disconnection from power, before others lose power.

2. Background

In developed nations, during extreme summer days, demand for electricity peaks due to heavy usage of appliances, such as air conditioning. Utility companies, in order to handle the unexpected peak load, are forced to source the additional supply at a hefty premium. Ideally, utilities would like to control peak load in order to avoid sourcing power at an exorbitant price.

In emerging markets such as, for example, India, the supply of energy continuously lags behind demand. The current gap between peak demand and supply in India is approximately 12% for power and 1% for energy. As a result, there is typically less power than is desired.

In order to bring the demand below supply, utility companies simply shut off the supply of electricity to different areas of a city as per a scheduled—and many times an unscheduled—plan. This phenomenon forces rolling electricity shut down in emerging markets known as a blackout or load shedding. Rolling blackouts negatively affect the day-to-day lives of consumers.

Problems resulting from mismatch of power demand and supply are likely to worsen in countries over the next couple of decades. For example, given the 8.5% gross domestic product (GDP) growth rate of India, the demand for electricity in India is expected to more than double by 2020 to 400,000 MW and become more than four times current levels, or 950,000 MW, by 2030. The current production capacity is pegged at 150,000 MW. This implies issues with the widening supply-demand gap in electrical power in India.

While the government is working to increase production, the gap is widening due to increased consumption. To eliminate a power crisis, especially during the peak load periods, developed nations have proposed leveraging the sophisticated smart grid infrastructure that uses smart meters to monitor usage and demand of energy. This infrastructure employs a control center to send signals to smart appliances or smart meters to either provide price per unit increases at peak load time or to execute demand response in which certain loads are temporarily, but intelligently, shed in order to reduce load. The intelligence varies, but is usually to shed loads across multiple customers and in a way that is most convenient to the utility, for instance, in a way that is easy to track and account for in customer bills.

However, a smart grid solution may not be feasible in emerging markets for multiple reasons, a few of which include: (1) lack of smart grid infrastructure; (2) the prohibitive costs of deploying smart meters and smart appliances; and (3) the inability to scale to a level that would allow sufficient control to prevent rolling blackouts. Therefore, a need exists to better address the problems of excess demand.

BRIEF SUMMARY

Because rolling blackouts make consumers feel powerless regarding the loss of power during key times of day on any given day during the year, studies have shown that consumers want some choice over which appliances are disconnected from power or adjusted to receive more or less power and when this is to occur, and that consumers may be willing to pay a surcharge rather than lose power to some appliances at inopportune times.

The disclosed systems and methods are for reducing power demand on a power grid through demand side management by, at least in part, customers of a central utility of a power grid. The reduction in power is performed using input from the customers. In one aspect, one or more smart appliances at the customer site are controlled by the central authority. Each smart appliance has one or more sensors that generate data related to power usage (and other information) and one or more processors that, based on receiving a command from the central authority, control power consumption of the smart appliances (such as disconnecting or adjusting power to the smart appliance).

The central utility of the power grid may not directly control the appliances, but may instead inform customers what appliances should be turned off, for instance according to a pre-arranged agreement between the customer and the utility. Additionally, the central utility may provide alerts to the customers before actually turning off the devices when the central utility does remotely disconnect or adjust power of the appliances.

In another aspect, one or more smart plugs are used to control the customer devices. In particular, one or more smart plugs are employed at customer residences in different locations of the power grid. The smart plug, when electrically connected with appliances (or devices) of the customers, allows a central authority (such as the central utility) to intelligently control the appliances through the smart plug without the need to replace the appliance with a smart appliance.

When smart plugs are referred to herein, the smart plugs need not be external plugs but are intended to also include power interface connections integrated within a switchboard or circuit breaker, for instance, at time of installation or as retrofitted later after a building is constructed. Accordingly, customers may not need to buy and/or install smart plugs into their homes for execution of the disclosed methods.

Sensors coupled with one or more individual sockets of the smart plugs provide data regarding power consumption of each individual appliance plugged in or connected to respective sockets. The central utility may send commands to the smart plug to control the flow of power to one, some or all of the individual appliances. For example, the central utility may determine which appliances to control according to previously-designated customer priorities, and may send one or more commands to one or more smart plugs to turn power to the sockets on or off, thus shutting off the determined appliances, or adjust power to the sockets to decrease or increase an amount of power supplied. Based on the command, the one or more smart plugs may control internal electronics, such as one or more relays, switches or controllers, in order to execute the command to control the power to the determined appliances. The central utility may also send data from the sensors, and optionally analytics information related to the data, to customer computing devices for consideration by the customers when deciding how to prioritize their appliances. The central utility may execute the disclosed methods through at least one processor and memory of a computing device such as a server or other computer.

The customers may assign priorities to the appliances connected to respective sockets and/or to smart appliances at a residence of the customers. For instance, the priorities may set a numerical preference level or other preference indicative of a customer-preferred sequence. In turn, the central authority may use the indication of the customer-preferred sequence in order to reduce or refine the customer's power consumption, such as disconnection of the appliances from the power grid and/or adjustment of power received by the appliances from the power grid. In particular, the central utility may use the priorities, and optionally other data received from the sensors, to decide which appliances to turn off or adjust first when a demand reduction is required. For instance, lower priority appliances such as a luxury items may be adjusted or disconnected before basic appliances such as lights and fans. The central utility may apply additional analysis and rules to decide to which customer residences, and in which order, are commands to be sent to execute demand response on appliances according to priorities of respective customers of those residences.

Accordingly, the customer's input, the smart plugs or smart appliances, and the additional central utility functionality provide utilities and energy providers with a new mechanism for demand management by providing a mechanism to control appliances beyond the ordinary utility meter. This mechanism puts consumers in control of their energy consumption while allowing utilities to manage demand response in an efficient and cost-effective manner as discussed below.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
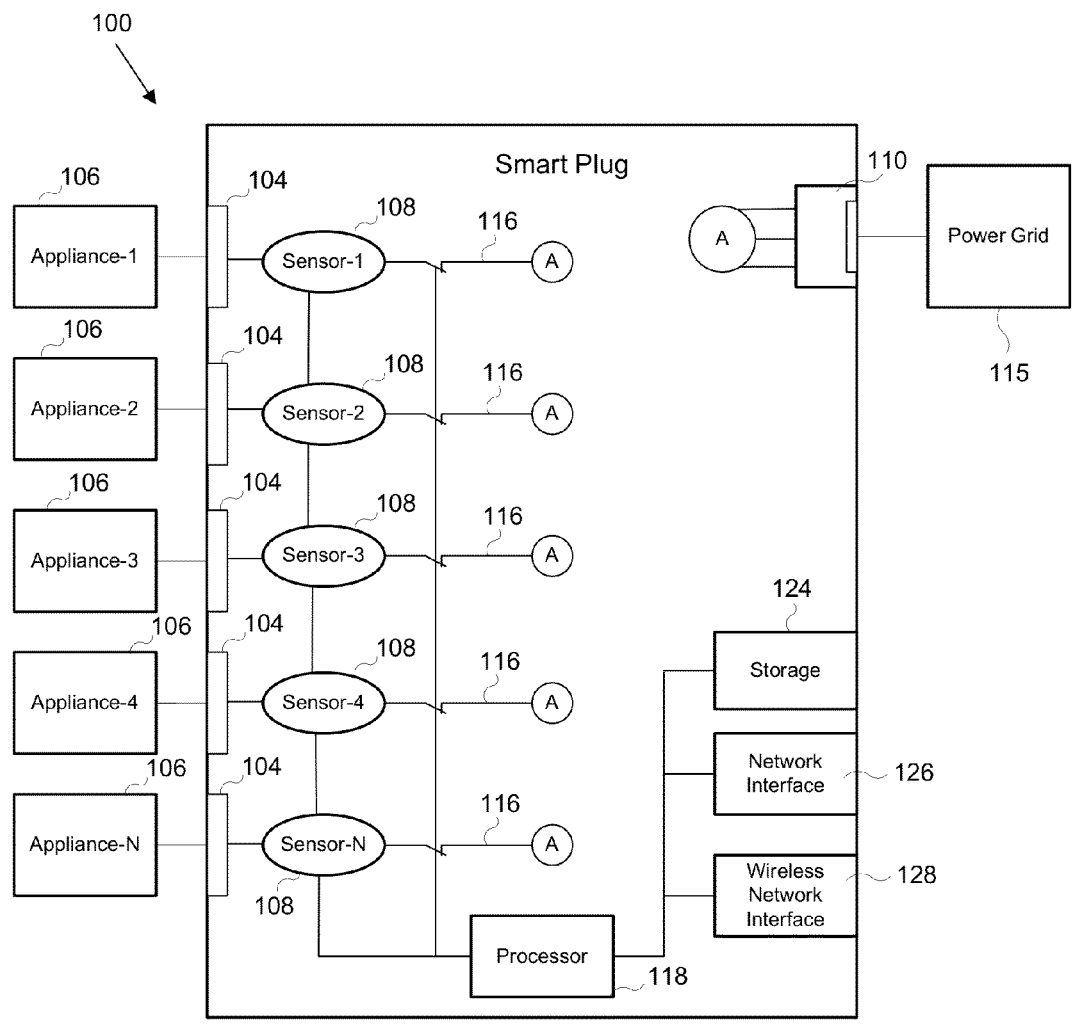
FIG. 1 is a circuit diagram of one configuration of a smart plug according to the present disclosure.

By way of overview, the example embodiments described below relate to a method and system for reducing power demand on a power grid through demand side management by customers of a central utility of a power grid. The central utility accounts for customer preferences and sends one or more commands to control the customer's power consumption. In one aspect, the central utility communicates with one or more smart plugs in order to control power consumption. In particular, one or more smart plugs may be used at the customer residences in different locations of the power grid, such as throughout the power grid. The smart plug improves control of the appliances (or devices) whose power consumption is unable to be controlled remotely, accounting for customer-assigned priorities and/or allowing the central utility to control the appliances, thereby obviating the need to upgrade to more expensive smart appliances. In another aspect, the central utility may communicate with one or more smart appliances, which are responsive to a command from the central utility to control its power consumption.

The term "appliance" may be used generically herein for any electrical device or machine that may affect power consumption for a power grid (such as an electrical device that consumes power and draws power from the power grid or an electrical device that generates power and contributes power to the power grid). For instance, appliances that consume power may refer to a refrigerator, oven, television, stereo, lamp, furnace and air conditioner to name just a few examples.

Sensors coupled with individual sockets of the smart plugs (or located within smart appliances) generate data regarding one or more aspects of power consumption (or usage) of one, some or each individual appliance plugged into respective sockets. For example, the sensors may generate sensor data relating to any aspect of electric power, such as the watts consumed by a respective appliance. The central utility may send commands that control the flow of power to one, some, or all of the sockets (or smart appliances), such as to turn power on or off to the sockets (or the smart appliances) through use of relays or switches, according to assigned customer priorities.

The customer may provide his or her input as to the control or the prioritization of the appliances in one of several ways. In a first way, the consumer may provide input through a device separate from the smart plug(s) or smart appliance(s). For example, the central utility may provide a Web or network graphical user interface (GUI) to the customers through which the customers may assign priorities to one or more appliances connected to customer smart plug(s) and to stand-alone smart appliances, the priorities indicating a preference level that the respective one or more appliances not be disconnected from being powered by the power grid or be adjusted as to a level of power provided thereto by the power grid. The adjustment may indicate to a thermostat control, for instance, to adjust the temperature setting lower in the winter or higher in the summer, to thereby draw less power. A refrigerator, freezer and/or furnace may include a thermostat and other appliances capable of receipt of variable levels of power are envisioned.

The central utility may also send data, such as usage data, from the sensors of the smart appliances and the smart plugs corresponding to specific appliances to the GUI of a customer computing device. The usage data may be presented according to times/days of the usage, thus making the data contextual to peak or lower usage periods. Such data presented to the customers may help the customers decide which priorities to assign to which appliances, and whether to program the priorities to adjust differently according to time of day or day of a week.

In a second way, the customer may provide input as to the control or prioritization of the appliances using the smart plug or smart appliance. As one example, the smart plug/appliance may include one or more dials or user input devices to indicate an ordering of the priority of control of the appliances. In particular, a dial may be associated with each of the sockets or smart appliances, with the consumer setting the respective dial to indicate the priority of control (e.g., a dial set to "1" indicates that it is the last device to be turned off). The dial setting may be transmitted to the central utility via a network interface (such as network interface 126 described below).

As another example, the smart plug may have pre-assigned priorities, with the customer plugging in the appliances to a respective socket depending on the pre-assigned priorities. In particular, a first socket (which is, for example, associated with Sensor-1 illustrated in FIG. 1) can be pre-assigned to receive the plug of the appliance that the consumer wishes to assign the highest priority and the last device to be turned off. Likewise, a second socket (which is, for example, associated with Sensor-2 illustrated in FIG. 1) can be pre-assigned to receive the plug of the appliance that the consumer wishes to assign the second highest priority and the second-to-last device to be turned off. In this way, the consumer may provide his or her input as to the assigned priority (by selectively plugging in the appliances to a respective socket) and the central utility may know (based on the pre-assigned priority) the ordering of the customer's priority.

In one embodiment, a high priority indicates a low preference for loss of power and lower priority appliances will be disconnected or adjusted first. A low priority, therefore, may indicate a high preference for the loss of power from an appliance if any appliance must lose power during demand response executed by the central utility. The combination of priorities of multiple appliances dictates a preferred order according to which the one or more appliances are to lose power or be disconnected. The priority may also depend on time of day or week, or a customer may log into the Web or network interface to update the priorities at any time. In another embodiment, a high priority may reference a preference of loss of power, and therefore a high priority may be assigned to those appliances to which power should first be disconnected or adjusted during demand response. Accordingly, labeling priority as "high" or "low" is unimportant to the present embodiments.

Furthermore, a status or category of a customer may dictate whether the customer is chosen first from which to execute load shedding or demand response. Customers may receive a discount or rebate, for instance through a power bill, for a per-unit of power saved during a time period in which an appliance is disconnected or receives less power. The system may employ sophisticated rules to determine when to disconnect power from or adjust power to certain customers and according to certain incentives.

It is believed that globally about 60% of all consumers are interested in technology that can completely automate management of electricity they use. In this way, a large segment of the population are convenience-oriented and thus prefer programs that contain "Set-And-Forget" functionality. More than one-third (about 36%) of consumers would be interested in being able to monitor and manage their usage through the latest personal electronics, such as tablet computers. And, about 32% would like to be able to measure their personal electricity usage in real time using a mobile application. The idea of a mobile application that monitors personal power consumption is especially popular in emerging markets where 60% express an interest in it, compared to just 26% in developed markets. Such monitoring is made possible through usage data received from the sensors coupled with respective sockets of the smart plugs.

It is further believed that many consumers prefer to maintain ultimate control over their home and require the ability to override any external control factors. Interestingly, research further illustrates that to operate electricity management programs, some customers may "opt-in" to allow third-party providers access to personal usage information if they perceive value in doing so.

The implications for utilities and electricity providers is that consumers will opt-in and share personal usage information when they first trust their electricity provider and when the utility can clearly explain and alleviate concerns related to the level of control implicit in the program offer. Accordingly, when the smart plugs (and smart appliances) are purchased and used by customers, the utility may gather data from the smart appliances and from identified dumb appliances connected to the sockets with which to associate respective appliances with the control provided by the smart plug.

In summary, it is believed that an energy demand response solution may succeed where, among other things: (1) appliances that can be turned off in the home are decided by the customer; (2) utilities with permission from consumers who have signed up for the demand management programs ("opt-in") can turn off appliances in customer residences during peak load time based on choice of each customer; and (3) customers participate in demand management in return for a decrease in their electricity bills and/or loyalty rewards from the utility providers. The disclosed smart plug allows a utility to successfully implement a demand response system as discussed in more detail below.

Turning to the drawings, wherein like reference numerals refer to like elements, FIG. 1 illustrates a circuit diagram of one configuration of a smart plug 100 according to the present disclosure. The smart plug 100 may be programmatically controllable that may remotely detect, monitor, calculate and control energy consumption of electrical devices/appliances connected to the smart plug 100. As previously indicated, a smart appliance (90 in FIGS. 2 and 3) may be used in conjunction with (or instead of) the smart plugs to provide intelligence and control capabilities to the central authority or utility. Accordingly, a smart appliance may include the same components as the smart plugs 100 with the only exception being the absence of sockets because the smart appliance may be connected directly to the power grid through conventional power sockets of a customer residence.

The smart plug 100 includes one or more sockets 104 into which are connected corresponding appliances 106. Each socket 104 is electrically coupled with a corresponding sensor 108. The term "coupled with" is defined herein as directly or indirectly connected to a component, optionally through one or more intermediate components, with the coupling allowing the flow of power through the socket to the respective appliance. The smart plug 100 includes a power connector 110 for connecting to a power grid 115. The power connector 110 may supply the power or energy from the smart grid to respective sockets 104. Electronic circuitry may be disposed between the sockets 104 and the power connector 110. Examples of electronic circuitry include one or more switches or relays (or other actuator) 116, as shown in FIG. 1.

A processor 118 is configured to receive data from the sensors 108, to receive commands from a central utility (FIGS. 2-3), and control the switches or relays 116 according to the commands received from the central utility. The command received may be from a central controller or a distributed controller of the central utility. The sensors may provide, in addition to usage information, additional information about an environment in which the smart plug resides, for instance one or more of: movement, levels of light, temperature and inactivity of an appliance. This additional data may also be sent to the central utility, which may be used in isolation or combined with priorities assigned to appliances by customers to decide which appliances to shut off first.

The smart plug 100 may include computer storage 124 (or memory for storage of sensor data or the like), a network interface 126 and/or a wireless network interface 128 coupled with and controllable by the processor 118. Communication through the network interface 126 may be by Ethernet, fiber or any other type of wired connection to a network, including but not limited to a wide area or local area network, or the Internet. This wired communication may also include Power Line Communication Systems (PLC) in which a modulated carrier signal is impressed on the customer premises wiring system. In particular, PLC may be used to send coded signals along a home or building's existing electric wiring to programmable smart plugs 100. These signals convey commands that correspond to "addresses" or locations of specific appliances based on respective sensor identities, and that control how and when those appliances operate.

Communication though the wireless network interface 128 may be according to any sort of known wireless standard, such as IEEE 802.11, IEEE 802.15.4-2003 (Zigbee), Bluetooth or WiFi. The Zigbee standard, for instance, allows intercommunication of low-power wireless devices such as the smart plugs 100 that may intercommunicate in a way that passes data on from other smart plugs(s) 100. While the wireless network interface 128 may be intended for low-power communication of data from the sensors 108, the wireless network interface 128 may also support higher power communication for instance with cellular towers that may facilitate communication directly with the central utility.

Figure 2:
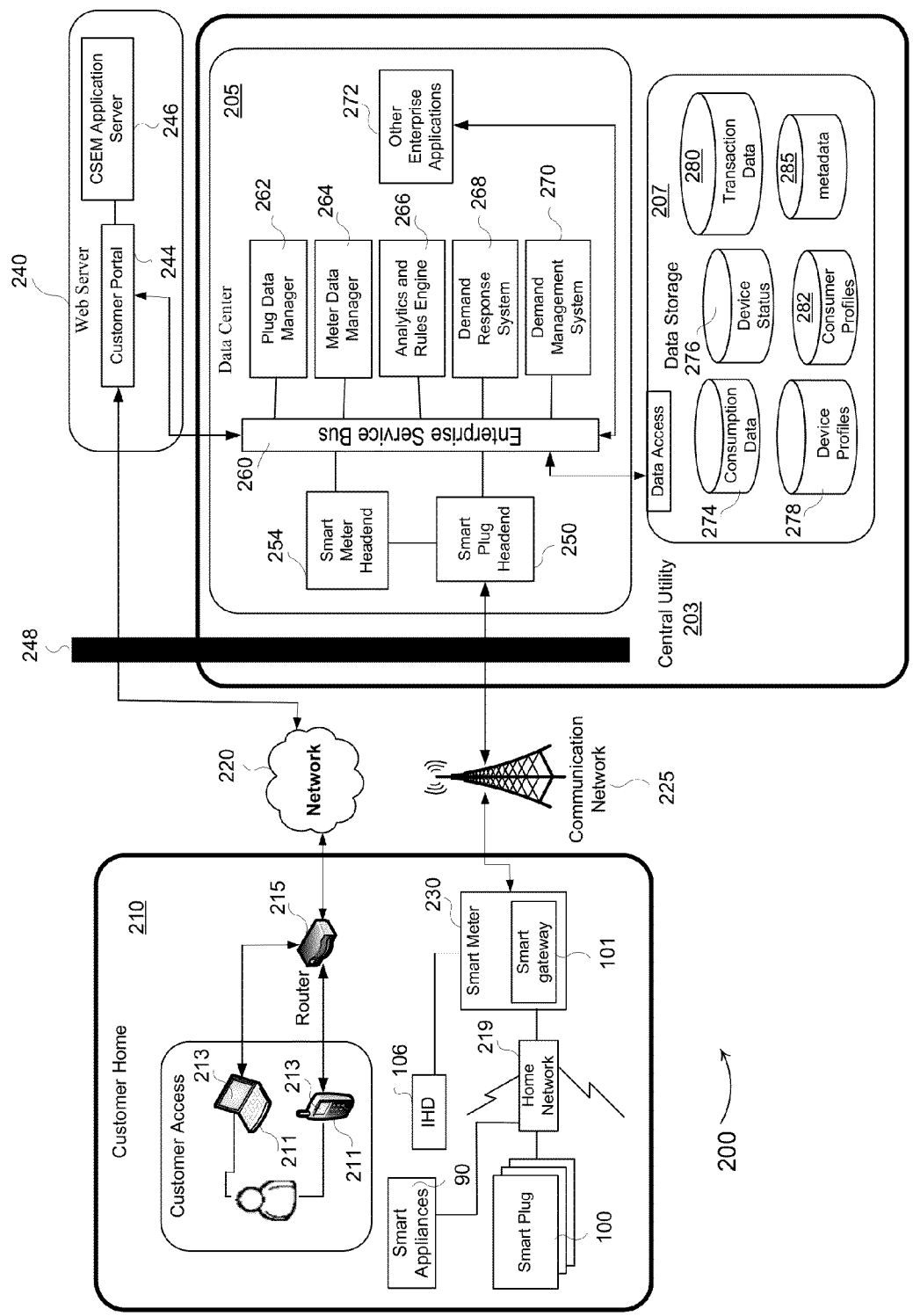
FIG. 2 is a block diagram of a tightly-coupled architecture of a system for reducing demand on a power grid through demand side management.
Figure 3:
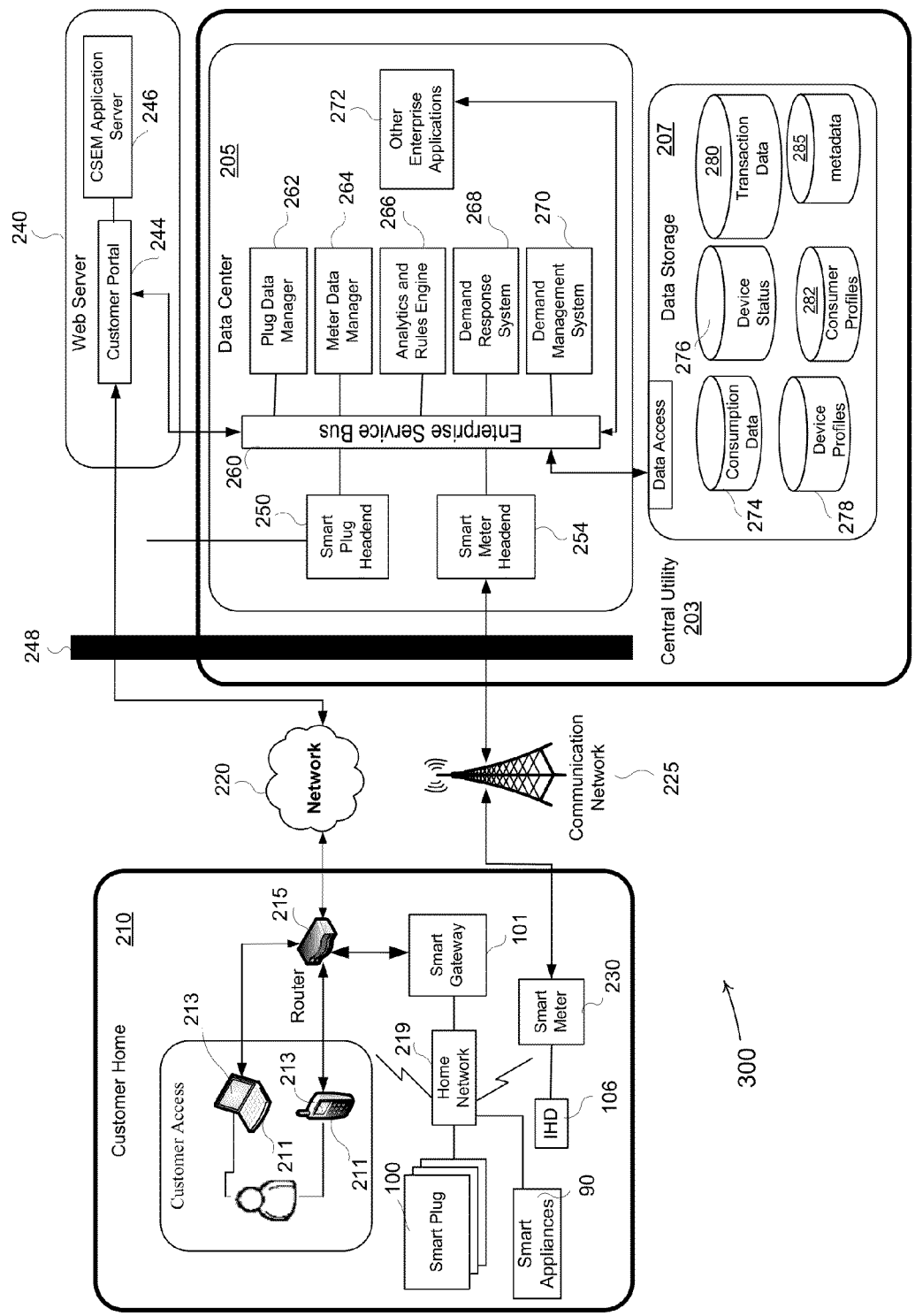
FIG. 3 is a block diagram of a loosely-coupled architecture of a system for reducing demand on a power grid through demand side management.

The processor 118 sends data read from each respective sensor 108 to the central utility (FIGS. 2-3). The sensors 108 measure voltage and current consumed by appliances (or devices) 106 connected to respective sockets 104. The processor 118 may further calculate consumed power or a power factor of the respective appliances, or this analysis may be performed at the central utility as will be discussed. Accordingly, data sent to the central utility may include consumed voltage, current and/or power from each respective appliance identified by way of sensors connected to respective sockets.

The processor 118 may further receive commands from the central utility to disconnect or adjust power to one or more of the sockets 108, to thus turn off the appliances (or devices) 106 connected to respective sockets. The processor 118 turns off or adjusts power to the one or more sockets 108 by opening one or more of the switches or relays 116 (or triggering an actuator). Likewise, the commands, when executed, may reconnect power to respective sockets, thus turning appliances back on that are connected to the respective sockets by closing the switches or relays 116 or toggling an actuator. These commands may be sent wirelessly or by wired communication as discussed.

FIGS. 2 and 3 illustrate systems 200 and 300, respectively representing tightly-coupled and loosely-coupled architectures for reducing demand on a power grid through demand side management. Each system includes a central utility 203 having a data center 205 and data storage 207, which may be included in a single server or in a distributed computing system. The systems may also include one or more customer homes or residences 210 each including one or more computing devices 211 such as a laptop, personal computer, mobile device, a vehicle in-dash computer or an in-home automated display. Each computing device 211 may include a display 209 in which a graphical user interface (GUI) may be displayed and through which the customer may interact, e.g., through a browser or other application. The customer home 210 may further include a router 215.

The systems 200 and 300 may include a computer network 220 and a communication network 225. The computer network 220 may include a wide area network (WAN), a local area network (LAN), an intranet or the Internet or World Wide Web. The communication network 225 may be a network provided by the central utility and can include PLC capability through the power grid 115, a cellular network or a combination thereof. Often, the communication network 225 is provided by the cellular operators, which could be third party providers. In one embodiment, the communication network may be combined with the network 220 and accessible to the Internet. The home router 215 communicates over the computer network 220 with a Web server 240.

The customer home 210 may further include one or more smart appliances 90 and one or more smart plugs 100 that communicate with a smart gateway 101 through a home network 219. The smart gateway 101 may be a smart plug (or smart appliance) identical or substantially similar to the smart plug 100 previously introduced, but connected and configured such as to act as a network gateway. Alternatively, the smart gateway 101 may be a dedicated gateway that communicates with the smart plugs 100 but does not act as a smart plug 100.

The home network 219 may be a low-powered wireless network such as IEEE 802.11 or IEEE 802.15.4-2003 (Zigbee), a PLC network and/or an optical network. Another example of wired communication of the home network 219 may include an additional bus (such as a two-wire bus) installed along with normal electric wiring. Sometimes termed "Instabus," this two-wire bus may link all appliances to a central of the computing devices 211. Thus, the additional bus may allow a centralized, rather than a decentralized communication system. The home area network 218 further includes one or more appliances or in-home devices (IHD) 106 connected to the one or more smart plugs and at least one smart meter 230.

The way the components of the home area network 218 interact and couple with each other will dictate whether the systems are of a loosely coupled or a tightly coupled architecture. The description of the system 200 or 300 as "tightly-coupled" or "loosely-coupled" is from the perspective of a central utility 203.

With reference to FIG. 2, when the smart gateway 101 is integrated with the smart meter 230 of the central utility, the architecture is referred to as tightly-coupled. In this way, the smart appliances 90 and the smart plugs 100 are coupled by the home network 219 directly to the communication network 225—and thus to the central utility—by way of the smart gateway 101 that is integrated with the smart meter 230. Communication and control of the smart appliances 90 and the smart plugs 100, therefore, is directly with the central utility. Reference to smart appliances 90 may be left out of parts of the present disclosure for simplicity; however, smart appliances 90 may be considered by the systems 200 and 300 in addition to dumb appliances 106 plugged into sockets of the smart plugs 100.

With reference to FIG. 3, in contrast to FIG. 2, when the smart plugs 100 (and smart appliances 90) are connected directly to the network 220 (such as the Internet) through the router 215 in a more open form of communication, it is referred to as a loosely-coupled architecture. In this architecture, the smart gateway 101 includes the Ethernet interface 128 (FIG. 1) or similar wired network interface for connection to a digital subscriber line (DSL) or cable modem or the like acting as the router 215. Where the smart plug 100 acts as the gateway 101, the smart gateway 101 may use the Internet to send device-level consumption data in the customer's home 210 to the central utility 203 back-end systems. The loosely-coupled architecture allows remote home energy monitoring solutions even in countries where the smart-grid infrastructure does not exist.

The systems 200 and 300 may further include a Web server 240 through which customers may access a customer portal 244, which may be provided through a consumer-centric smart energy management (CSEM) application server 246 or the like. A CSEM client (not shown) may be executed on the computing devices 211 within a browser or other application to supply customer access to the customer portal 244. The customer portal 244 may be executed from and delivered by the Web server 240 for display and access on the customer computing devices 211. The Web server 240 may be integrated within (or co-located with) the central utility 203 back-end systems and share a common set of data security services 248. The data security services 248 may provide security in the form of a firewall and through virus, spam and malware filtration types of services.

The data center 205 of the central utility 203 may further include a smart plug headend 250 for communicating through the communication network 225 with the smart gateway 101 in the tightly-coupled architecture (FIG. 2) or for communicating through the network 220 with the smart gateway 101 in the loosely-coupled architecture (FIG. 3). The data center may further include a smart meter headend 254 for communicating through the networks 220 and 225 with any smart meters 230 that may be present in the customer's home.

The data center 205 further includes an enterprise service bus 260 for the intercommunication of the components of the data center 205 and the web server 240, including the customer portal 244. The data center 205 may provide data from the sensors of the smart plugs 100 through the enterprise service bus 260 for presentation to the customers in a Web interface or Web application in the display 213 of one or more customer computing devices 211. The customer portal 244 may also present information to customers related to analytics of the data, and may also receive priorities and time periods for such priorities from the customers as entered into the customer portal by way of the Web interface or Web application of a GUI of the computing devices 211. The customers may then make decisions on prioritization of appliances based on this data and analytics viewed on their computing devices 211.

A number of processors or modules may be coupled with the enterprise services bus 160, including but not limited to, a plug data manager 262, a meter data manager 264, an analytics and rules engine 266, a demand response system 268, a demand management system 270 and other enterprise applications 272 as may be necessary for the monitoring and control of components of the power grid 115.

The data storage 207 may be stored on a server or in a distributed fashion across the computer network 220 and/or the communication network 225. The data storage 207 may include, but not be limited to, power consumption data 274, device statuses 276, device profiles 278, transaction data 280, consumer profiles 282 and metadata 285 related to the data stored in the data storage 207. This data, as categorized, may relate at least to power utilization and usage history related to respective customer homes 210, and profiles built from such data or transactions conducted by the customers. This history and these transactions may include customer choices of priorities assigned to identified devices or appliances. For instance, a database for the device profiles 278 may save a history of priorities assigned to specific appliances over time.

The plug data manager 262 is configured to receive and manage data from the smart plugs 100, e.g., by storing it in the correct databases of the data storage 207 and sending the data in the correct format to the analytics and rules engine 266 or to other enterprise applications 272. The meter data manager 264 may receive and manage data from the smart meters 230. The analytics and rules engine 266 may analyze data from the power grid 115 and from respective customer homes 210 and decide when power usage will be greater than available supply. The analytics and rules engine 266 may then select a customer home from which to adjust or disconnect power and from which of one or more appliances at the selected home, to reduce the demand sufficiently so that it is not greater than the supply.

The demand response system 268 may then send commands according to the determinations made by the analytics and rules engine 266 indicative of which appliances/devices are to be disconnected or adjusted and at which homes. The processors 118 of the smart plugs 100 into which respective appliances are connected may activate or deactivate the relay or switch 116 connected to the socket 104 into which the respective appliances that are to be controlled are connected. In this way, the smart plugs 100 may adjust or disconnect power to the appliances specified in the commands of the demand response system 268 in which the systems 200 and 300 seek to meet a reduction in power demand that before was handled with rolling blackouts. Similar commands may then be sent by the demand response system 268 to restore power to specified appliances in specified customer homes when a surplus of power is made available within the power grid. Such a surplus of power may be created by less natural demand on the power grid, such as due to weather changes, or because the analytics and rules engine 266 has determined that it is the turn of other customer(s) and/or appliance(s) to be disconnected or power thereto adjusted based on the current set of priorities and rules.

The customers may assign, through the customer portal 244, priorities for one more appliances or in-home devices 106. The meaning of different levels of priorities is flexible as discussed previously, and may change depending on a time of day or a day of week or some other temporal factor. For instance, priorities may be assigned as a number between 1 (one) and 5 (five). In one embodiment, a 1 can be a low priority and a 5 a high priority. In an alternative embodiment, a 1 can be a high priority and a 5 a low priority. Customers may change the priorities to different appliances on a house-by-house basis or however often the customers desire.

By providing the central utility 203 with priorities of respective appliances, the customer indicates a preferred sequence for disconnection of, or adjustment of power to, the appliances of the customer from the power grid. The result is that the demand response system 268 may send commands to disconnect or adjust appliances in a prescribed order as preferred by the customer, leaving a level of control with the customer in regards to which appliances lose power. Some customers may also be willing to pay a surcharge to be considered a more preferred customer and thus receive fewer commands to have appliances lose power.

In the case of tightly-coupled architecture (FIG. 2), where the smart gateway 101 is integrated with the smart meter 230, when demand is close to exceeding supply, utilities can apportion the available supply among the homes in an area and provide the limits to the smart meters corresponding to the homes. The smart appliances 90 and smart plugs 100 that are connected to the smart meter can pick up this information and turn off devices or appliances of lower priority as set by the customer. Furthermore, the smart gateway 101 may receive control messages (or commands) from the central utility and directly turn off/adjust appliances connected to smart plugs or directly turn off/adjust the smart appliances.

In the case of loosely-coupled architecture (FIG. 3), customers can participate in the demand management program by authorizing the utilities to turn off or adjust devices of lower priority over the Internet when demand exceeds supply. The utility company can remotely turn off or adjust lower priority devices in the consumer's home over the Internet in a secure manner, and continue this process across multiple homes until the demand falls below supply.

The following are a number of exemplary algorithms and rules that may govern the analytics and rules engine 266, the demand response system 268 and the demand management system 270 in the intelligence that drives demand response to control demand on the power grid when demand is greater than available supply.

Assumptions and Notations
N houses: 1, 2, ..., N
Rebate for House i: Rebate$_i$
House i has M appliances: $A_{i,1}, A_{i,2}, \ldots, A_{i,M}$
Power (Wattage) of Appliance j in House i is denoted by: $W_{i,j}$
Preference/Priority of Appliance j in House i is denoted by: $P_{i,j}$
One (1) is lowest priority (should be turned off or adjusted first) and M is the highest priority.
Supply: S
Demand: D
Gap G=D−S
Algorithm 1

Choose a random number R between 1 and N, thus choosing a customer house randomly. While the algorithms below state random choice as a first choice, there are alternatives to randomly choosing the number R for a customer. For instance, the system may always start with the same customer, but give that customer a $50/month (or higher) rebate. As an alternative, the system may always start with the house next to the last house to receive a power cut and progress to houses that have gone the longest without having power levels to appliances adjusted or disconnected. As a further alternative, the system may start with the house that has consumed the power in a neighborhood over the last month. The other algorithms below may be similarly modified.

```
House = R;
For (k=1; k<=M; k++)
For (i = 1; i<=N; i++)
    If G > 0 then
        Pick A_{House,j} such that P_{House,j} = k and turn it off or adjust;
        Rebate_{House} = Rebate_{House} + Per_Unit_Incentive * W_{House,j};
        G = G - W_{House,j};
        House = (R+1) mod N ;
    Endfor
Endfor
```

Algorithm 1 therefore provides a rebate for participating as well as a per-unit (wattage) incentive for saved power for each customer house that participates in the demand reduction executed by the system. The rebate and/or the per-unit incentive may be applied to a bill or by way of a deposit into a bank account or a check sent in the mail.

Now, assume there are two categories of appliances such as (1) basic and (2) luxury. House i has $M_{i,1}$ luxury appliances: $L_{i,1}, L_{i,2}, \ldots, L_{i,Mi,1}$ and $M_{i,2}$ basic appliances: $B_{i,1}, B_{i,2}, \ldots, B_{i,Mi,2}$. These two categories are just examples, and could be expanded to include a spectrum of categories tied to levels of need, for instance: Critical+, Critical, Basic+, Basic, Comfort+, Comfort, Luxury+, and Luxury. For instance, the system may assign categories to appliances according to this spectrum:

Critical: Medical devices (Heart Rate monitor, ECG etc.);
Critical+: Critical plus Ventilation system etc.
Basic: Lights+TV;
Basic+: Basic plus Fans;
Comfort: Basic plus Heater, Refrigerator, Microwave, Washing Machine, and/or Dishwasher;
Comfort+: Comfort plus AC and Home Theater system;
Luxury: Comfort plus Jacuzzi, etc.;
Luxury+: Luxury plus Home Automation System etc.;

The preference of critical or basic appliances is higher while that of luxury appliances is lower. Preference of Basic appliance j in House i is denoted by $PB_{i,j}$ while Preference of Luxury appliance j in House i is denoted by $PL_{i,j}$. The system may assign a critical or critical+ category to certain life-saving or medical-related appliances as a threshold category to make sure they are highly prioritized and always powered at normal levels by the power grid, absent a natural disaster.

One (1) is the lowest priority (should be turned off or adjusted first); and $M_{i,1}$ is the highest priority of luxury appliances while $M_{i,2}$ is the highest priority of basic appliances.

Algorithm 2

Choose a random number R1 between 1 and N, thus choosing a customer's house randomly.

```
House = R1;
For (k=1; k<=M_{House,1}; k++)
    For (i = 1; i<=N; i++)
        If G > 0 then
            Pick A_{House,j} such that PL_{House,j} = k and turn it off or adjust;
            Rebate_{House} = Rebate_{House} + Per_Unit_Incentive_L * W_{House,j};
            G = G - W_{House,j};
            House = (R1+1) mod N ;
    Endfor
Endfor
/* Repeat with basic appliances that have different per
unit incentive */
```

Choose a random number R2 between 1 and N.

```
House = R2;
For (k=1; k<=M_{House,2}; k++)
    For (i = 1; i<=N; i++)
        If G > 0 then
            Pick A_{House,j} such that PB_{House,j} = k and turn it off or adjust;
            Rebate_{House} = Rebate_{House} + Per_Unit_Incentive_B * W_{House,j};
            G = G - W_{House,j};
            House = (R2+1) mod N ;
    Endfor
Endfor
```

Now, assume there are two categories of customers: premier (or more-preferred) and non-premier (or less-preferred). Also assume that Customer Category of House i is denoted by $CC_i$ and $CC_i$=P for Premier customers and $CC_i$=NP for Non-Premier customers.

While for purposes of Algorithm 3 (below) the two categories makes the example easier to follow, the systems 200 and 300 may use any number of categories, which themselves may be determined by an amount the customer is willing to pay per unit of energy consumption. For instance, the categories of customers may include, but not be limited to: diamond; platinum; gold; silver; and bronze where the bronze and silver customers have appliances disconnected before the diamond and platinum customers. Customers may therefore be categorized as follows in one example in terms of what surcharge the customers are willing to pay:

Bronze: 5 cents/KWH

Silver: 10 cents/KWH

Gold: 20 cents/KWH

Platinum: 35 cents/KWH

Diamond: 50 cents/KWH

Categorizing customers in this way may be executed as a monetary exchange or bidding system in which customers who outbid other customers may receive a more-preferred status.

Algorithm 3

Choose a random number R1 between 1 and N.

```
House = R1;
For (k=1; k<=M_{House,1}; k++)
    For (i = 1; i<=N; i++)
        If G > 0 then
            If CC_{House} = NP then
                Pick A_{House,j} such that PL_{House,j} = k and turn it off or
adjust;
                Rebate_{House} = Rebate_{House} +
Per_Unit_Incentive_LNP * W_{House,j};
                G = G - W_{House,j};
                House = (R1+1) mod N ;
        Endfor
    Endfor
    /* Repeat with luxury appliances of premier/preferred customers
who have different per unit incentive */
```

Choose a random number R1 between 1 and N.

```
House = R1;
For (k=1; k<=M_{House,1}; k++)
    For (i = 1; i<=N; i++)
        If G > 0 then
            If CC_{House} = P then
                Pick A_{House,j} such that PL_{House,j} = k and turn it off or
adjust;
                Rebate_{House} = Rebate_{House} + Per_Unit_Incentive_LP *
W_{House,j};
                G = G - W_{House,j};
                House = (R1+1) mod N ;
        Endfor
    Endfor
```

Choose a random number R2 between 1 and N.

```
House = R2;
For (k=1; k<=M_{House,2}; k++)
    For (i = 1; i<=N; i++)
        If G > 0 then
            If CC_{House} = NP then
                Pick A_{House,j} such that PB_{House,j} = k and turn it off or
adjust;
                Rebate_{House} = Rebate_{House} + Per_Unit_Incentive_BNP *
W_{House,j};
                G = G - W_{House,j};
                House = (R2+1) mod N ;
        Endfor
    Endfor
    /* Repeat with basic appliances of premier/preferred customers who
have different per unit incentive */
```

Choose a random number R2 between 1 and N.

```
House = R2;
For (k=1; k<=M_{House,2}; k++)
    For (i = 1; i<=N; i++)
        If G > 0 then
            If CC_{House} = P then
                Pick A_{House,j} such that PB_{House,j} = k and turn it off or
adjust;
                Rebate_{House} = Rebate_{House} + Per_Unit_Incentive_BP *
W_{House,j};
                G = G - W_{House,j};
                House = (R2+1) mod N ;
        Endfor
    Endfor
```

Now, assume every house has a different willingness to pay for basic and luxury appliances and the houses are sorted such that House 1 has the lowest willingness to pay while house N has the highest willing to pay. In addition, the per-unit incentive is also different for each house.

Algorithm 4

```
House = 1;
For (k=1; k<=M_{House,1}; k++)
    For (i = 1; i<=N; i++)
        If G > 0 then
            Pick A_{House,j} such that PL_{House,j} = k and turn it off or
adjust;
            Rebate_{House} = Rebate_{House} + Per_Unit_Incentive_L_i *
W_{House,j};
            G = G - W_{House,j};
            House++;
        Endfor
    Endfor
    /* Repeat with basic appliances that have different per unit incentive
for each house */
    House = 1;
For (k=1; k<=M_{House,2}; k++)
    For (i = 1; i<=N; i++)
        If G > 0 then
            Pick A_{House,j} such that PB_{House,j} = k and turn it off or
adjust;
            Rebate_{House} = Rebate_{House} + Per_Unit_Incentive_B_i *
W_{House,j};
            G = G - W_{House,j};
            House++;
        Endfor
    Endfor
```

Figure 4:
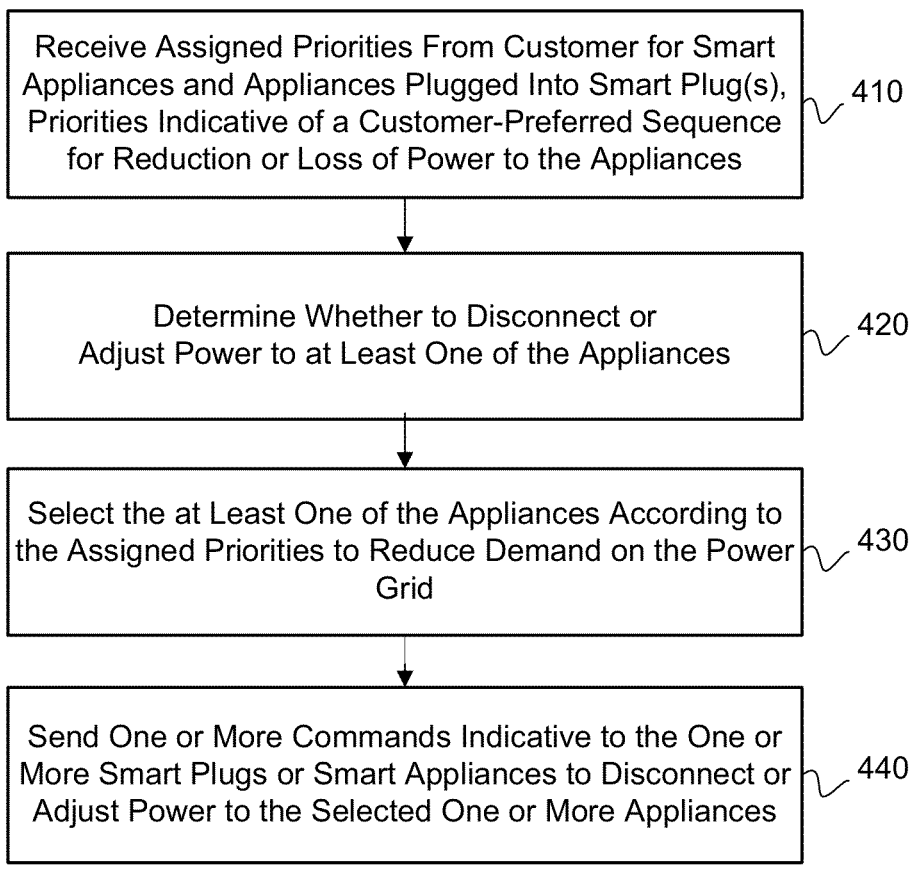
FIG. 4 is a flow chart of an exemplary method for reducing demand on a power grid through demand side management as executed by a central utility.

FIG. 4 is a flow chart of an exemplary method for reducing demand on a power grid through demand side management as executed by a central utility. The method may be executed by at least one processor and memory of a computing device of the disclosed system.

At block 410, the system receives assigned priorities from a customer for a plurality of smart appliances and for appliances plugged into corresponding sockets of one or more smart plugs of the customer, the assigned priorities indicative of a customer-preferred sequence for disconnection of, or adjustment of power to, the plurality of appliances from the power grid. At block 420, the system determines whether to disconnect to adjust power to at least one of the appliances of the customer. At block 430, the system selects at least one of the appliances according to the assigned priorities to reduce demand on the power grid. At block 440, the system sends one or more commands, the one or more commands indicative to the one or more smart plugs to adjust or disconnect power to the selected at least one of the appliances, based on selecting at least one of the plurality of appliances.

Figure 5:
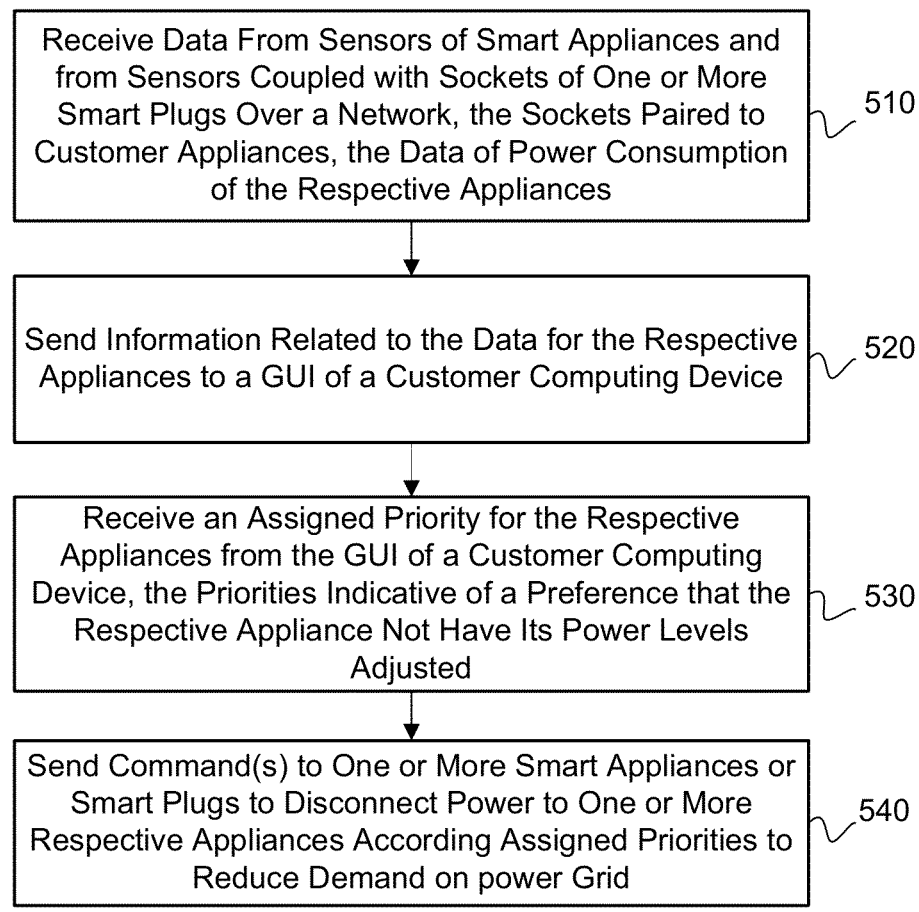
FIG. 5 is a flow chart of another exemplary method for reducing demand on a power grid through demand side management as executed by a central utility.

FIG. 5 is a flow chart of another exemplary method for reducing demand on a power grid through demand side management as executed by a central utility. The method may be executed by at least one processor and memory of a computing device of the disclosed system.

At block 510, the system receives data from sensors coupled with sockets of one or more smart appliances and smart plugs over a network, the sockets paired to a plurality of appliances of a customer, the data indicative of power consumption of the respective appliances. At block 520, the system sends information related to the data for the respective appliances to a graphical user or network interface (GUI) of a customer computing device of the customer. At block 530, the system receives an assigned priority for the respective appliances from the GUI, the assigned priorities indicative of preference that the respective appliances not have their power levels adjusted, including and up to disconnection from being powered by the power grid. At block 540, sends commands to one or more smart appliances or smart plugs to disconnect or adjust power to one or more respective appliances according to the assigned priorities to reduce demand on the power grid.

Figure 6:
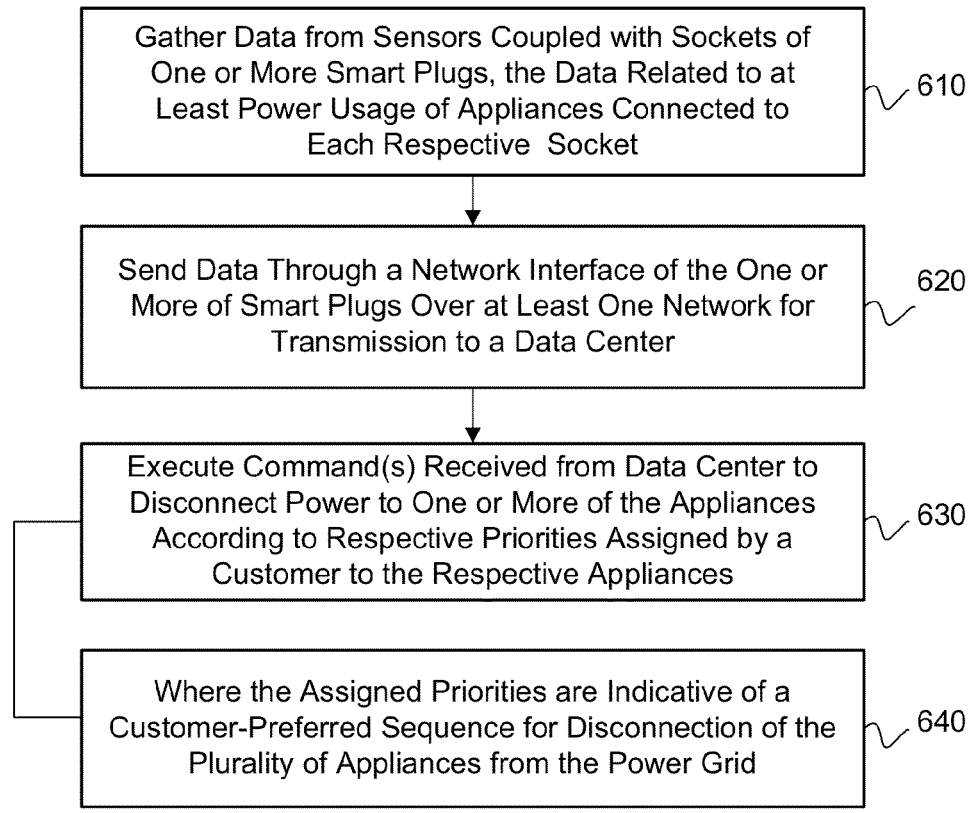
FIG. 6 is a flow chart of a method for reducing demand on a power grid through demand side management of the power grid from the perspective of a smart plug located at a customer residence.

FIG. 6 is a flow chart of a method for reducing demand on a power grid through demand side management of the power grid from the perspective of a smart plug located at a customer residence. The method may be executed by at least one processor of the smart plug.

At block 610, one or more smart plugs gather data from sensors coupled with sockets of the one or more smart plugs, the data related to at least power usage of the appliances connected to each respective socket. At block 620, the one or more smart plugs send the data through a network interface of the one or more smart plugs over at least one network for transmission to a data center. At block 630, the one or more smart plugs execute one or more commands received from the data center to disconnect power to one or more of the appliances according to priorities assigned by a customer to the respective appliances. At block 640, the assigned priorities are indicative of a customer-preferred sequence for disconnection of the plurality of appliances from the power grid.

Figure 7:
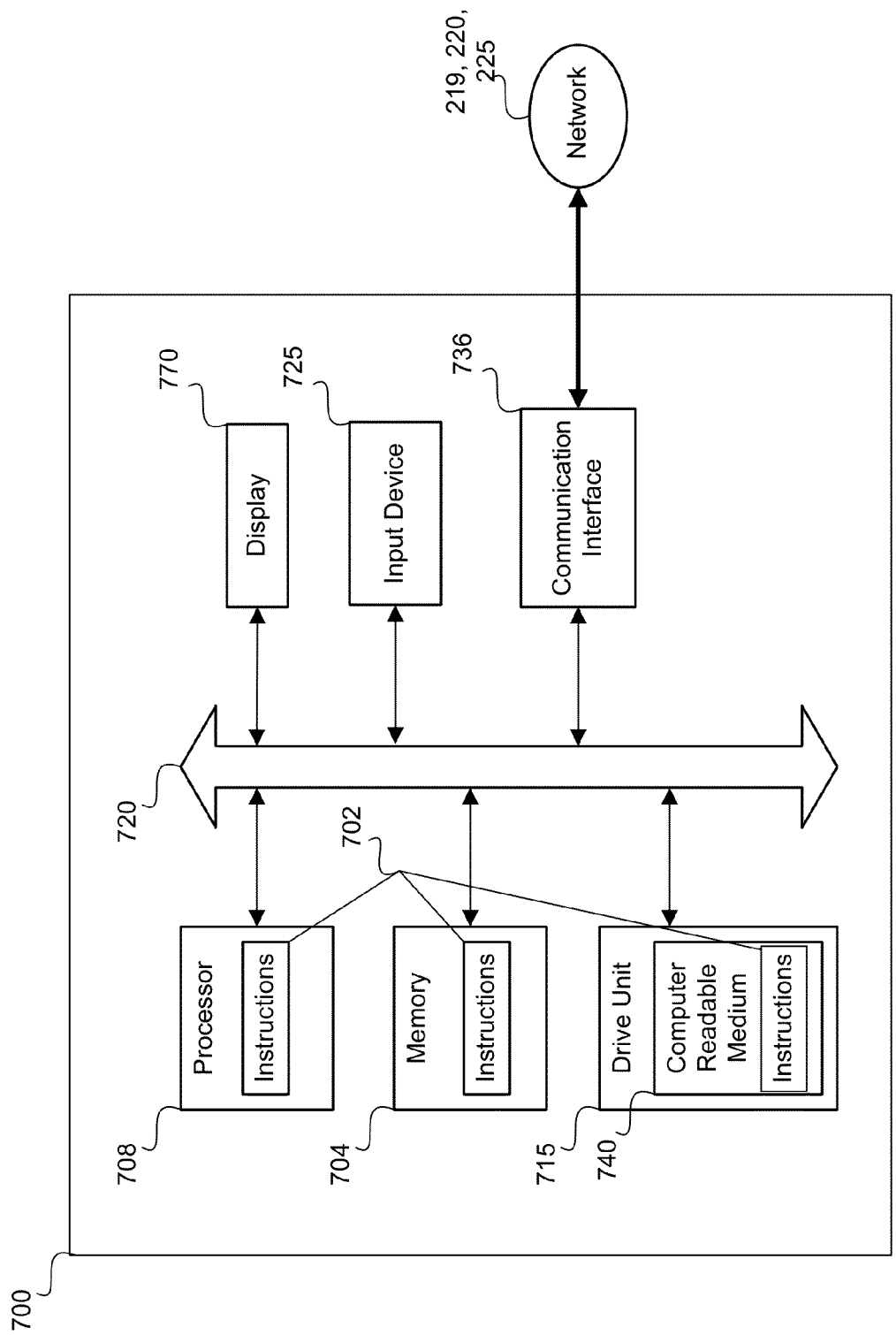
FIG. 7 is a general computer system, programmable to be a specific computer system, which may represent any of the computing devices referenced herein.

FIG. 7 illustrates a general computer system 700, programmable to be a specific computer system 700, which may represent any server, computer or component such as a smart plug 100 (or group thereof) of the demand side management system 200 or 300. The computer system 700 may include an ordered listing of a set of instructions 702 that may be executed to cause the computer system 700 to perform any one or more of the methods or computer-based functions disclosed herein. The computer system 700 may operate as a stand-alone device or may be connected, e.g., using the network 219, 220, and/or 225, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile computing device capable of executing a set of instructions 702 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 700 may include a memory 704 on a bus 720 for communicating information. Code operable to cause the computer system to perform any of the acts or operations described herein may be stored in the memory 704. The memory 704 may be a random-access memory, read-only memory, programmable memory, hard disk drive or any other type of volatile or non-volatile memory or storage device.

The computer system 700 may include a processor 708, such as a central processing unit (CPU) and/or a graphics processing unit (GPU). The processor 708 may include one or more general processors, digital signal processors, application specific integrated circuits, field programmable gate arrays, digital circuits, optical circuits, analog circuits, combinations thereof, or other now known or later-developed devices for analyzing and processing data. The processor 608 may implement the set of instructions 702 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 700 may also include a disk or optical drive unit 715. The disk drive unit 715 may include a computer-readable medium 740 in which one or more sets of instructions 702, e.g., software, can be embedded. Further, the instructions 702 may perform one or more of the operations as described herein. The instructions 702 may reside completely, or at least partially, within the memory 704 and/or within the processor 708 during execution by the computer system 700. Accordingly, the databases in data storage 207 above in FIGS. 2 and 3 may be stored in the memory 704 and/or the disk unit 715.

The memory 704 and the processor 708 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 700 may include an input device 725, such as a keyboard or mouse, configured for a user to interact with any of the components of system 700. It may further include a display 770, such as a liquid crystal display (LCD), a cathode ray tube (CRT), or any other display suitable for conveying information. The display 770 may act as an interface for the user to see the functioning of the processor 708, or specifically as an interface with the software stored in the memory 704 or the drive unit 715.

The computer system 700 may include a communication interface 736 that allows communications via the communications network 219, 220 and/or 225. The network 219, 220 and/or 225 may include wired networks, wireless networks, or combinations thereof. The communication interface 736 network may allow communications via any number of communication standards, such as 802.11, 802.17, 802.20, WiMax, 802.15.4, cellular telephone standards, or other communication standards. Just because one of these standards is listed does not mean any one is preferred as any number of these standards may never actually be adopted in a commercial product.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features allowing the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method comprising:
  receiving, using a central utility data center computer having at least one processor and memory, assigned priorities from a customer for a plurality of appliances, the assigned priorities indicative of a customer-preferred sequence for disconnection of, or adjustment of power to, the plurality of appliances from a power grid;
  receiving, from over a first network via a customer home network, at a smartplug headend included in the central utility data center computer, data indicative of power consumption of each of a plurality of respective appliances from a plurality of respective first smart plugs through which the respective appliances are receiving power;
  receiving, from over a second network, at a smart meter headend included in the central utility data center computer, data from a smart meter, the data from the smart meter indicative of power consumption of each of a plurality of respective appliances from a plurality of respective second smart plugs through which the respective appliances are receiving power;
  determining, using the at least one processor, whether to disconnect or adjust power to at least one of the appliances of the customer based on the received data;
  selecting at least one of the plurality of appliances according to the assigned priorities to reduce demand on the power grid; and
  based on selecting at least one of the plurality of appliances, sending one or more commands with the central utility data center computer over the first network to the first smart plugs via the customer home network or sending one or more commands with the central utility data center computer over the second network to the second smart plugs via the smart meter, the one or more commands executable by the first smart plugs or the second smart plugs to disconnect or adjust power to the selected at least one of the appliances, to thus reduce demand on the power grid through demand side management thereof.

2. The method of claim 1, where the plurality of appliances comprise smart appliances configured to execute the one or more commands to disconnect or adjust power to the selected at least one of the appliances, the central utility data center computer configured to communicate the one or more commands to the smart appliances over the first network via the customer home network or over the second network via the smart meter.

3. The method of claim 2, where each smart appliance includes at least one sensor coupled with a power connector thereof, the method further comprising:
  receiving data from the smart appliances over the first network or the second network with the central utility data center computer, the data generated by the sensors and indicative of at least power usage of the respective smart appliances; and
  sending, with central utility data center computer over the first network, information related to the data for the respective smart appliances to a customer computing device of the customer for presentation in a graphical user interface (GUI) executable on the customer computing device.

4. The method of claim 2, where each smart appliance includes at least one sensor located within a respective smart appliance and coupled with a power connector thereof, where the at least one sensor of one of the smart appliances is further configured to provide data related to an environment of the respective smart appliance, the method further comprising:
  sending a command executable by the selected at least one of the smart appliances over the first network or the second network, the command executable by the selected at least one of the smart appliances to disconnect or adjust the at least one of the appliances based at least in part on information derived from the data obtained from the environment detected by the at least one sensor.

5. The method of claim 1, where the plurality of appliances are plugged into corresponding sockets of respective first or second smart plugs of the customer, the respective first or second smart plugs configured to disconnect or adjust power to the selected at least one of the appliances.

6. The method of claim 5, where each first and second smart plug includes one or more sockets and at least one sensor coupled with each respective socket, the sockets paired with the respective appliances, the method further comprising:
  receiving data from the respective first or second smart plugs over the first network or the second network, respectively, the data generated by the sensors and indicative of at least power usage of the respective appliances; and
  sending information related to the data for the respective appliances over the first network to a customer home computing device of the customer for presentation in a graphical user interface (GUI) executable on the customer home computing device.

7. The method of claim 6, where the first network comprises: an Internet or extranet to communicate to the respective first smart plugs via a smart gateway; and the second network comprises a power grid communication network including a smart gateway integrated with the smart meter of the power grid to communicate to the respective second smart plugs.

8. The method of claim 3, further comprising:
receiving, over the first network from the GUI, the assigned priorities as entered by the customer for the respective appliances.

9. The method of claim 6, where the GUI comprises an application or browser executable on one or more of: a computer; a mobile device; a vehicle; and an in-home display.

10. The method of claim 5, where each first or second smart plug includes a plurality of sockets and at least one sensor coupled with each respective socket, the sockets paired with the respective appliances.

11. The method of claim 6, where an appliance assigned a low priority is disconnected or adjusted before an appliance assigned a high priority, the method further comprising:
receiving data from one or more sensors over the first network or the second network, the data indicative of a category of the respective appliances;
categorizing at least some of the respective appliances based on the data;
assigning a low priority to appliances categorized as less-important or luxury;
assigning a medium to high priority to appliances categorized as basic; and
assigning a high priority to appliances categorized as necessary or critical.

12. The method of claim 6, where at least one of the sensors is further configured to provide data related to an environment in which the respective first or second smart plug resides, the method further comprising:
sending a command to the respective first or second smart plug to disconnect or adjust the at least one of the appliances based at least in part on information derived from the data obtained from the environment detected by the at least one sensor.

13. The method of claim 1, further comprising:
assigning a threshold priority to appliances of a specific, identified type.

14. The method of claim 1, further comprising:
providing a discount or a rebate to the customer on a utility bill of the customer based on disconnecting the power from or adjusting the power to the at least one of the appliances.

15. The method of claim 14, where an amount of the discount or rebate is based at least in part on a per-unit rate of power saved during a time that the at least one of the appliances is disconnected or adjusted.

16. The method of claim 15, where customers categorized in a first way have a different per-unit rate than customers categorized in a second way.

17. The method of claim 1, further comprising changing the assigned priority for each respective appliance with the central utility data center computer depending on one or both of: a day of a week and a time of day.

18. The method of claim 1, further comprising:
choosing a residence of the customer from among a plurality of residences of a plurality of respective customers at which to disconnect or adjust power to the selected at least one of the appliances.

19. The method of claim 18, where choosing the residence of the customer comprises choosing the residence of a customer based on a category of the customer, the method further comprising:
assigning one of a plurality of categories to each of at least some of the plurality of customers, the categories comprising at least less-preferred and more-preferred.

20. The method of claim 19, where choosing the residence of the customer further comprises randomly choosing from among less-preferred customers to disconnect from or adjust power to appliances before randomly choosing from among more-preferred customers to disconnect from or adjust power to appliances.

21. The method of claim 19, where the category assigned is based on a willingness to pay for a more-preferred status, the method further comprising:
providing a discount or a rebate to the customer on a utility bill of the customer based on disconnecting or adjusting the power to the selected at least one of the appliances, an amount of the discount or rebate comprising a per unit incentive set according to the category assigned to the customer.

22. A system for reducing demand on a power grid through demand side management thereof, comprising:
at least one utility data center server including at least one processor and computer memory;
a network interface coupled with the at least one utility data center server configured to communicate with customer residences over a first network and a second network;
the processor configured to:
receive assigned priorities from a customer for a plurality of appliances, the assigned priorities received over the first network and the second network, and indicative of a customer-preferred sequence for disconnection of, or adjustment of power to, the plurality of appliances from the power grid;
receive, from over the first network via a customer home network, at a smartplug headend included in the utility data center server, data indicative of power consumption of each of a plurality of respective appliances from a plurality of respective first smart plugs through which the respective appliances are receiving power;
receive, from over the second network, at a smart meter headend included in the utility data center server, data from a smart meter, the data from the smart meter indicative of power consumption of each of a plurality of respective appliances from a plurality of respective second smart plugs through which the respective appliances are receiving power;
determine whether to disconnect or adjust power to at least one of the appliances of the customer;
select at least one of the plurality of appliances according to the assigned priorities to reduce demand on the power grid; and
send one or more commands through the network interface over the first network to the first smart plugs via the customer home network or over the second network to the second smart plugs via the smart meter, the one or more commands sent to the selected at least one of the plurality of appliances over the first network or the second network based on the selected at least one of the appliances receiving power from a respective first smart plug or a respective second smart plug, the one or more commands executable by the respective first smart plug of the respective second smart plug to disconnect or adjust power to the selected at least one of the appliances.

23. The system of claim 22, where the plurality of appliances comprise smart appliances configured to execute the one or more commands to disconnect or adjust power to the selected at least one of the appliances, the at least one utility data center server configured to communicate the one or more commands over the first network via the customer home network or over the second network via the smart meter for receipt and execution by the smart appliances.

24. The system of claim 23, where each smart appliance includes at least one sensor coupled with a power connector thereof, the at least one processor further configured to:
receive data from the smart appliances over the first network or the second network, the data generated by the sensors and indicative of at least power usage of the respective smart appliances; and
send information related to the data for the respective smart appliances over the first network to a customer computing device of the customer for presentation in a graphical user interface (GUI) executable on the customer computing device.

25. The system of claim 23, where each smart appliance includes at least one sensor included in the smart appliance and coupled with a power connector thereof, where at least one sensor of one of the smart appliances is further configured to provide data related to an environment of the respective smart appliance, the at least one processor further configured to:
send a command to the selected at least one of the smart appliances over the first network or the second network, the command executable by the selected at least one of the smart appliances to disconnect or adjust the selected at least one of the smart appliances, the command sent based at least in part on information derived from the data obtained from the environment detected by the at least one sensor.

26. The system of claim 22, where the plurality of appliances are plugged into corresponding sockets of respective first or second smart plugs of the customer, the respective first or second smart plugs configured to execute the one or more commands to disconnect or adjust power to the selected at least one or the appliances.

27. The system of claim 26, where each first or second smart plug includes one or more sockets and at least one sensor coupled with each respective socket, the sockets paired with the respective appliances, the at least one processor further configured to:
receive data from the respective first or second smart plugs over the first network or the second network, respectively, the data generated by the sensors and indicative of at least power usage of the respective appliances; and
send information related to the data for the respective appliances over the first network to a customer home computing device of the customer for presentation in a graphical user interface (GUI) executable on the customer home computing device.

28. The system of claim 27, where the first network comprises: an Internet or extranet that provides connection to the respective first smartplugs via a smart gateway; and the second network comprises a power grid communication network including a smart gateway integrated with the smart meter of the power grid to communicate to the respective second smart plugs.

29. The system of claim 27, where the at least one processor further configured to receive, over the first network from the GUI, the assigned priorities as entered by the customer for the respective appliances.

30. The system of claim 24, where the GUI comprises an application or browser executable on one or more of: a computer; a mobile device; a vehicle; and an in-home display.

31. The system of claim 26, where each first or second smart plug includes a plurality of sockets and at least one sensor coupled with each respective socket, the sockets paired with the respective appliances.

32. The system of claim 24, where an appliance assigned a low priority is disconnected or adjusted before an appliance assigned a high priority, the at least one processor further configured to:
receive data from one or more sensors over the first network or the second network, the data indicative of a category of the respective appliances;
categorize at least some of the respective appliances based on the data;
assign a low priority to appliances categorized as less-important or luxury;
assign a medium to high priority to appliances categorized as basic; and
assign a high priority to appliances categorized as necessary or critical.

33. The system of claim 27, where at least one of the sensors is further configured to provide data related to an environment in which the respective first or second smart plug resides, the at least one processor further configured to send a command executable by the respective first or second smart plug to disconnect or adjust the at least one of the appliances based at least in part on information derived from the data obtained from the environment detected by the at least one sensor.

34. The system of claim 22, where the at least one processor is further configured to providing a discount or a rebate to the customer on a utility bill of the customer based on disconnecting the power from or adjusting the power to the at least one of the appliances.

35. The system of claim 34, where an amount of the discount or rebate is based at least in part on a per-unit rate of power saved during a time that the at least one of the appliances is disconnected or adjusted.

36. The system of claim 35, where customers categorized in a first way have a different per-unit rate than customers categorized in a second way.

37. The system of claim 22, where the at least one processor is further configured to change the assigned priority for each respective appliance dependent on one or both of: a day of a week and a time of day.

38. The system of claim 22, where the at least one processor is further configured to choose a residence of the customer from among a plurality of residences of a plurality of respective customers at which to disconnect or adjust power to the selected at least one of the appliances.

39. The system of claim 38, where the at least one processor is further configured to choose the residence of the customer randomly.

40. The system of claim 38, where the at least one processor is further configured to choose the residence of a customer that receives an incentive to be chosen before others of the plurality of respective customers.

41. The system of claim 38, where the at least one processor is further configured to choose the residence of a customer based on a category of the customer, the at least one processor further configured to assign one of a plurality of categories to each of at least some of the plurality of customers, the categories comprising at least less-preferred and more-preferred.

42. The system of claim 41, where the at least one processor is further configured to randomly choose from among less-preferred customers to disconnect from or adjust power to appliances before randomly choosing from among more-preferred customers to disconnect from or adjust power to appliances.

43. The system of claim 41, where the category assigned is based on a willingness to pay for a more-preferred status, the at least one processor further configured to provide a discount or a rebate to the customer on a utility bill of the customer based on disconnecting or adjusting the power to the selected at least one of the appliances, an amount of the discount or rebate comprising a per unit incentive set according to the category assigned to the customer.

44. A processor-implemented method to facilitate reduction in power demand on a power grid through demand side management of the power grid, the method comprising:

gathering data, using a first smart plug and a second smart plug, from sensors coupled with respective sockets of the first smart plug and the second smart plug, the data related to at least power usage of respective appliances connected to each respective socket;

sending the data gathered by the first smart plug, through a network interface of the first smart plug over a consumer home network for transmission to a utility data center via a first network;

sending the data gathered by the second smart plug, through a network interface of the second smart plug to a smart meter for transmission to a utility data center via a second network;

receiving and executing commands with the first smart plug, the commands received from the utility data center by the first smart plug over the home network via the first network; and receiving and executing commands with the second smart plug, the commands received from the utility data center by the second smart plug from the smart meter via the second network;

wherein the commands respectively executed by the first smart plug and the second smart plug cause the respective first smart plug and the second plug to disconnect or adjust power to one or more respective appliances according to priorities assigned by a customer to the respective appliances, the assigned priorities indicative of a customer-preferred sequence for disconnection of the plurality of appliances from the power grid, or adjustment of power received by the plurality of appliances from the power grid.

45. The method of claim 44, where receiving and executing the commands with the first smart plug or with the second smart plug further comprises:

identifying corresponding sockets to which the one or more appliances to be disconnected or adjusted are connected;

disconnecting power to the corresponding sockets by opening a relay or switch connected to the corresponding sockets of appliances to be disconnected; and varying an amount of power allowed to reach the corresponding sockets including the processor varying a controller of appliances to be adjusted.

46. The method of claim 44, where at least one of the sensors also provides data related to an environment in which the respective first or second smart plugs reside, where receiving and executing commands further comprises:

disconnecting or adjusting the one or more appliances based on information derived from the data obtained from the environment detected by the at least one sensor.

47. The method of claim 44, where the appliances assigned a higher priority are disconnected or adjusted before appliances assigned a lower priority.

48. The method of claim 44, where the appliances further include at least one smart appliance connected directly to the power grid and in communication with the utility data center over the first network via the consumer home network to send data and receive commands, the at least one smart appliance including at least one sensor and at least one processor, the commands received from the utility data center over the first network via the consumer home network being executable by the at least one processor of the at least one smart appliance and the at least one smart appliance being associated with one of the assigned priorities.

49. The method of claim 1, wherein the assigned priorities for the plurality of appliances are selected by the customer operating a user input device associated with each of the first smart plugs and the second smart plugs to individually set an assigned priority.

50. The method of claim 1, wherein the assigned priorities for the plurality of appliances are selected by the customer by connecting appliances to selected ones of the first smart plugs and the second smart plugs having a pre-assigned priority.

51. The method of claim 5, wherein each of the sockets on at least some of the first smart plugs and the second plugs have pre-assigned priorities, and wherein the assigned priorities for the plurality of appliances are selected by the customer by connecting appliances to selected ones of the sockets.

* * * * *